US007127787B2

(12) United States Patent
Whitehead

(10) Patent No.: US 7,127,787 B2

(45) Date of Patent: Oct. 31, 2006

(54) TOOL FOR DISCONNECTING A FUEL LINE FROM A FITTING

(75) Inventor: Michael L. Whitehead, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 165 days.

(21) Appl. No.: 10/888,194

(22) Filed: Jul. 9, 2004

(65) Prior Publication Data

US 2006/0005367 A1 Jan. 12, 2006

(51) Int. Cl.
*B23P 19/04* (2006.01)

(52) U.S. Cl. .......................................................... 29/237

(58) Field of Classification Search .................. 29/268, 29/235, 237, 272; 81/3.8, 13, 53.11, 424.5, 81/427; 7/125, 126; 294/99.1, 99.2, 33
See application file for complete search history.

(56) References Cited

U.S. PATENT DOCUMENTS 3,215,006 A * 11/1965 Urani .......................... 81/3.8
4,055,359 A 10/1977 McWethy
5,455,995 A 10/1995 Pool
6,195,862 B1 3/2001 Chang

OTHER PUBLICATIONS

Blue-Point® "Flat Access Fuel Line Disconnect Tool Set", Model No. YA 9457, Snap-On catalog.

* cited by examiner

*Primary Examiner*—Robert C. Watson
(74) *Attorney, Agent, or Firm*—Banner & Witcoff, Ltd.

(57) ABSTRACT

A tool for removal of a fuel line from a vehicle fuel module by engagement of and displacement of a locking member, said tool including first and second arms with semi-cylindrical sections at each end that may be used in combination to engage the locking member.

6 Claims, 5 Drawing Sheets

TOOL FOR DISCONNECTING A FUEL LINE FROM A FITTING

BACKGROUND OF THE INVENTION

In a principal aspect, the present invention relates to a tool useful for disconnection of both the inlet and outlet fuel supply lines to the fuel tank of a vehicle. The disconnect tool may be used in other environments, however, to disconnect fluid transport lines of the type which utilize a biased locking cylinder lock for engagement with a fitting compatible with the tube or line.

Various modern vehicles utilize fluid transfer lines which incorporate a cylindrical fitting at the end of the line capable of engaging and locking into a fitting. For example, the fuel lines of General Motors vehicles utilize a fuel module which includes an inlet line and an outlet line. Each line includes a cylindrical locking member which is biased in a longitudinal direction so as to lock against a fitting. To remove the fuel line from a fuel module fitting, it is necessary to push the cylindrical locking member against the biasing force. Once positioned in a release position, the cylinder lock no longer engages the fitting and the fuel line may be removed from the fitting. Various other motor vehicles utilize such fitting constructions.

Heretofore, there have been made available certain tools for the removal of such lines from fittings. For example, Snap-On Tools provides a fuel line disconnect tool set, Model YA9457 for such use. The described tool is in the form of a pliers which include elements at the distal or outer ends of the arms of the pliers. These elements may be positioned to engage the locking members to effect their disengagement from a fuel module.

Nonetheless, there has remained the need to provide a simple and inexpensive tool to disconnect fuel lines from fuel modules, particularly those associated with General Motors vehicles, but also for other vehicles and other instances where such lines are to be disconnected from a fitting. Such a tool, desirably, must be useable in a number of environments where access to the connection assembly is limited. These among other needs led to the development of the present tool.

SUMMARY OF THE INVENTION

Briefly, the present invention comprises a tool for removal of, or disconnection of a fuel line from a fitting. The fuel line is of the type which includes a biased generally cylindrical locking ring on the end of the fuel line for engaging and retaining the fuel line with a fitting. In order to disengage the fuel line from the fitting, the cylindrical locking member associated with the fuel line must be biased or moved against the biasing force to release the fuel line from engagement with the fitting. The tool of the present invention accomplishes these objectives by providing a first arm member which includes an elongate body section with semi-cylindrical end sections projecting from opposite ends of the body member. A separate, second arm member, which in a preferred embodiment, is substantially a mirror image of the first arm member. The semi-cylindrical end sections of each of the arm members are designed to be separately engageable with the cylindrical locking ring of a fuel line.

In operation, a first one of the semi-cylindrical sections is engaged with the end of the fuel line to move or push the locking ring in a desired manner. The second arm member is then appropriately positioned in combination with the first arm member so that the appropriate cylindrical sections of the first and second arm members are engaged with the locking ring of the fuel line. In this manner, each of the separate arm members may be positioned independently in a manner which in combination will effect release of the fuel line. As a result, the tool is very useful, particularly in highly restricted areas. That is, because the tool is comprised of two separate elements; namely, a first arm member and a second arm member which are independent of one another, the elements may be independently positioned to engage a fuel line locking ring and release that ring. Adjustment of the arm members independently of each other and positioning of the arm members independently of each other, but in the final analysis assembling them in combination, provides a tool which is highly effective for removal of fuel lines, particularly in restricted areas.

Thus, it is an object of the invention to provide an improved tool for disconnecting a fuel line from a fitting.

It is a further object of the invention to provide a tool for disconnecting lines from fittings wherein the tool is comprised of independent and separate first and second arm members which work in combination to effect such removal.

A further object of the invention is to provide a tool for disconnecting a fuel line from a fitting which is economical, easy to use, rugged, and inexpensive.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

Figure 4:
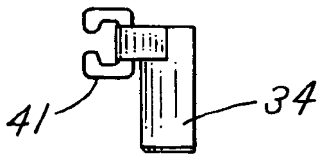
FIG. 4 is a right hand end view of the tool of FIG. 1.
Figure 2:
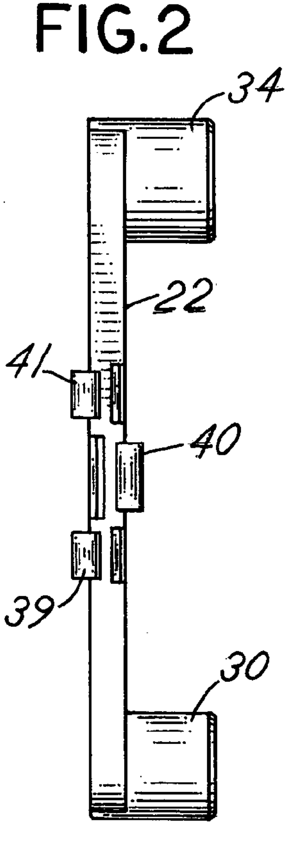
FIG. 2 is a top plan view of the arm of FIG. 1.
Figure 1:
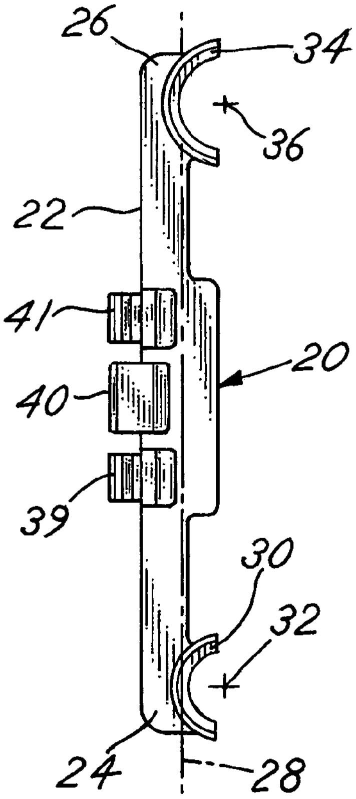
FIG. 1 is a side elevation of a first arm member or right hand arm of the tool.
Figure 3:
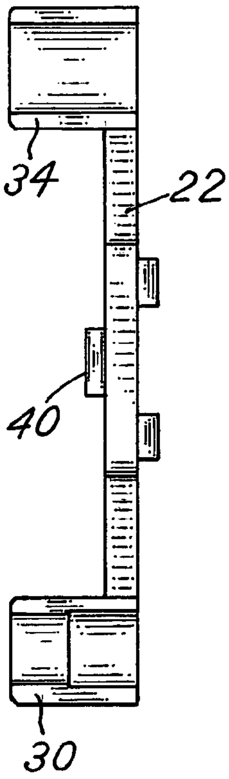
FIG. 3 is a bottom plan view of the arm of FIG. 1.
Figure 5:
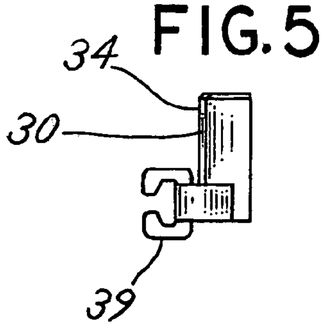
FIG. 5 is a left hand end view of the tool of FIG. 1.
Figure 9:
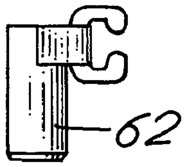
FIG. 9 is a right hand end view of the arm of FIG. 6.
Figure 7:
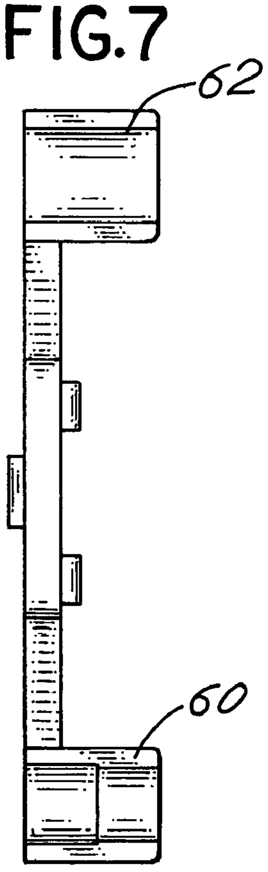
FIG. 7 is a bottom plan view of the arm of FIG. 6.
Figure 6:
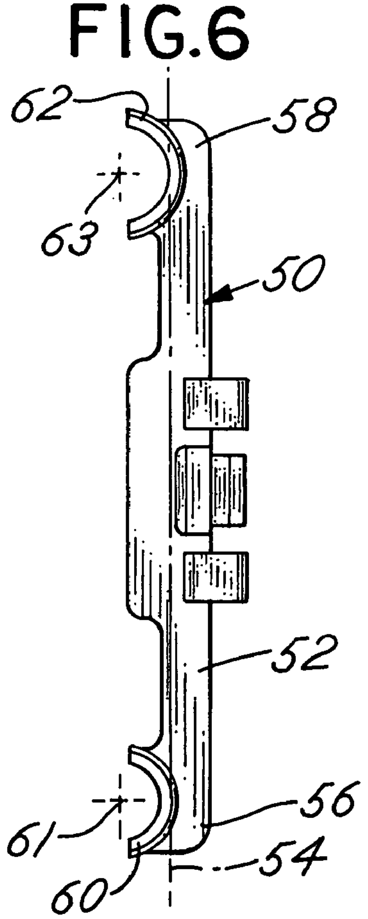
FIG. 6 is a plan view of the second arm member or left hand arm of the tool of the invention.
Figure 8:
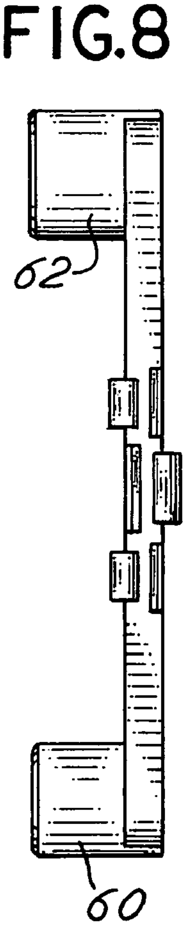
FIG. 8 is a top plan view of the arm of FIG. 6.
Figure 10:
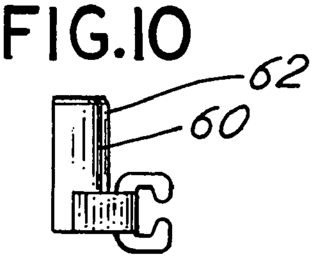
FIG. 10 is a left hand end view of the arm of FIG. 6.

Referring to the drawings, the tool of the invention is comprised of two separate or independent parts. One part comprises a first arm member 20 as illustrated in FIGS. 1–5. The second part comprises a second arm member 50 as illustrated in FIGS. 6–10. The first arm member 20 and the second arm member 50 are generally mirror images of each other. Thus, many of the aspects of the description of the first arm member 20 apply to the construction of the second arm member 50. Further, each arm member 20, 50 may be made from a molded plastic material such as acetal. However, the material utilized to manufacture the arm members 20 and 50 is not a limiting feature of the invention.

Referring therefore to FIGS. 1–5, the first arm member 20 which is also conveniently called a right arm 20, includes an elongate body member 22. The elongate body member 22 includes a first end 24 and an opposite or second end 26. A generally longitudinal straight line axis 28 extends between the ends 24 and 26. Projecting transversely to the axis 28 is a first, semi-cylindrical section 30 having an axis 32 generally transverse to the axis 28. Similarly, projecting from the second end 26 is a semi-cylindrical section 34 having an axis 36 also transverse to the longitudinal axis 28. In the preferred embodiment, the axes 32, 36 are parallel and the body member 22 is a straight line body member extending between the ends 24 and 26 and thus the axis 28 is a straight line axis. However, the axis 28 may be curved, angled, or otherwise configured. Most importantly, the body member 22 includes the first and second ends 24 and 26 having the transversely extending semi-cylindrical sections 30 and 34. Dimensionally, the spacing of the transverse axes 32 and 36 is in the range of 2 inches. The longitudinal extent of the semi-cylindrical members 30 and 34 is in the range of approximately ½ inch. Such dimensional characteristics enable use of the tool in highly restricted areas and facilitate manipulation by a service worker or mechanic.

The body member includes a series of projecting tabs 39, 40 and 41 which are provided merely for joinder of the first body member 20 to the second body member 50 for purposes of storage or display. In other words, the tabs 39, 40 and 41 do not become functionally involved in the operation of removal of a fuel line from a fitting.

The semi-cylindrical sections 30 and 34 are preferably formed so as to define a half section of a cylinder. However, the semi-cylindrical sections 30, 34 may be formed to be less than the half section of a cylinder. Thus, the invention is not to be limited to strictly semi-circular cylindrical sections 30 and 34. Lesser sections may be considered to be within the scope of the language "semi-cylindrical". The radius of each of the semi-cylindrical sections 30 and 34 is different. In other words, the semi-cylindrical section 30 has a lesser diameter or radius than the semi-cylindrical section 34. The radii or diameters are chosen to be compatible with the locking rings associated with fuel lines and other such lines.

FIGS. 6–10 disclose the second arm member 50 which is compatible with and substantially a mirror image of the first arm member 20. The second arm member 50 is also referred to as the left hand, or left arm member. Second arm member 50 thus includes an elongate body member 52 having a longitudinal axis 54. It further includes a first end 56 and the second end 58 with a semi-cylindrical section 60 associated with the first end 56 and a distinctly sized, semi-cylindrical section 62 associated with the second end 58. The semi-cylindrical section 60 has a radius or diameter substantially equal to the radius or diameter of the semi-cylindrical section 30 associated with the first arm 20. Likewise, the semi-cylindrical section 62 has a radius or diameter substantially equal to that of the semi-cylindrical section 34 associated with the first arm member 20. The semi-cylindrical section 60 includes an axis 61. The semi-cylindrical section 62 includes an axis of rotation 63. The axis 61 and the axis 63 are substantially parallel as are the axes 32 and 36 associated with the first arm member 20. In operation or use, all of the axes associated with the semi-cylindrical sections; namely, axes 61, 63, 32 and 36 are parallel to one another. Further, when the arm members 20 and 50 are in their utilitarian position, the semi-cylindrical sections 61, 63, 30 and 34 project axially in the same direction and for approximately the same distance from the body members 20 and 50.

Figure 11:
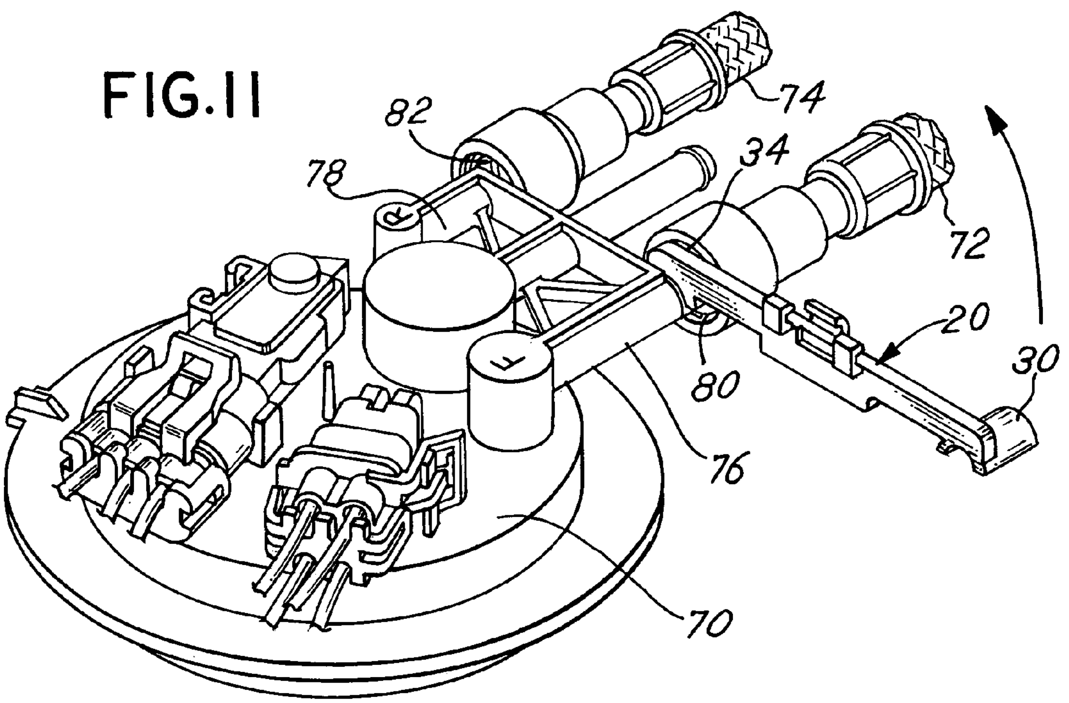
FIG. 11 is an isometric view illustrating the manner of positioning first arm member on a fuel line attached to a fuel module fitting.
Figure 12:
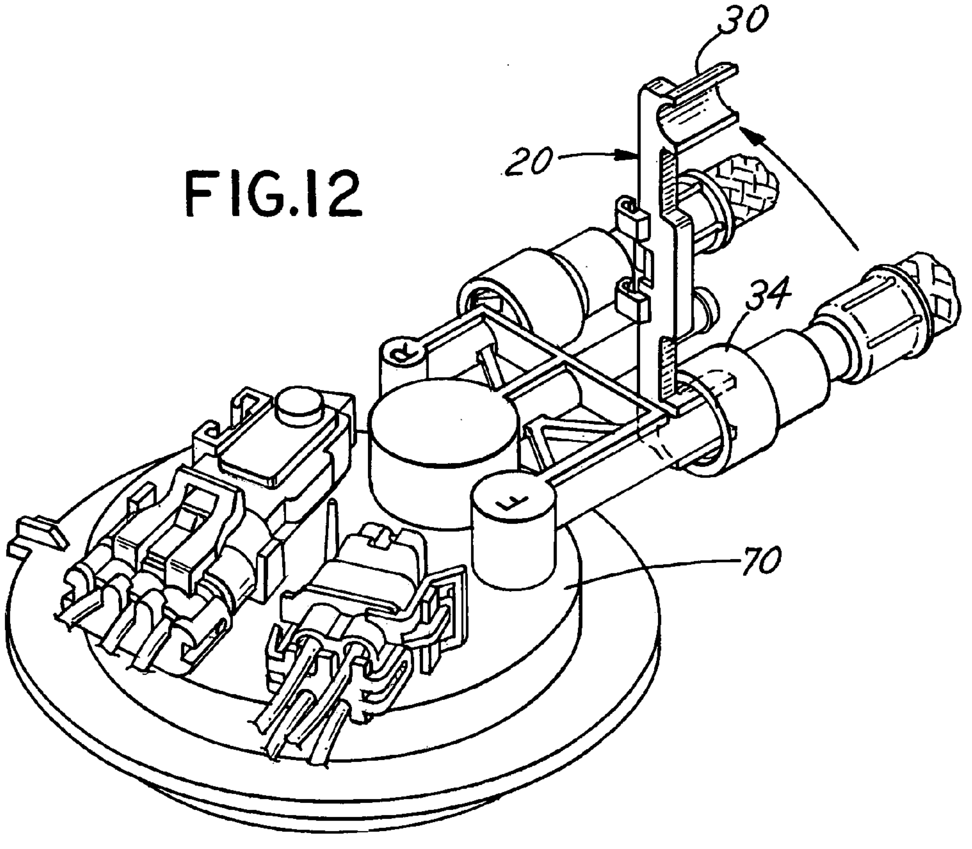
FIG. 12 illustrates the movement and further positioning of the arm member depicted in FIG. 11 in an isometric view.
Figure 13:
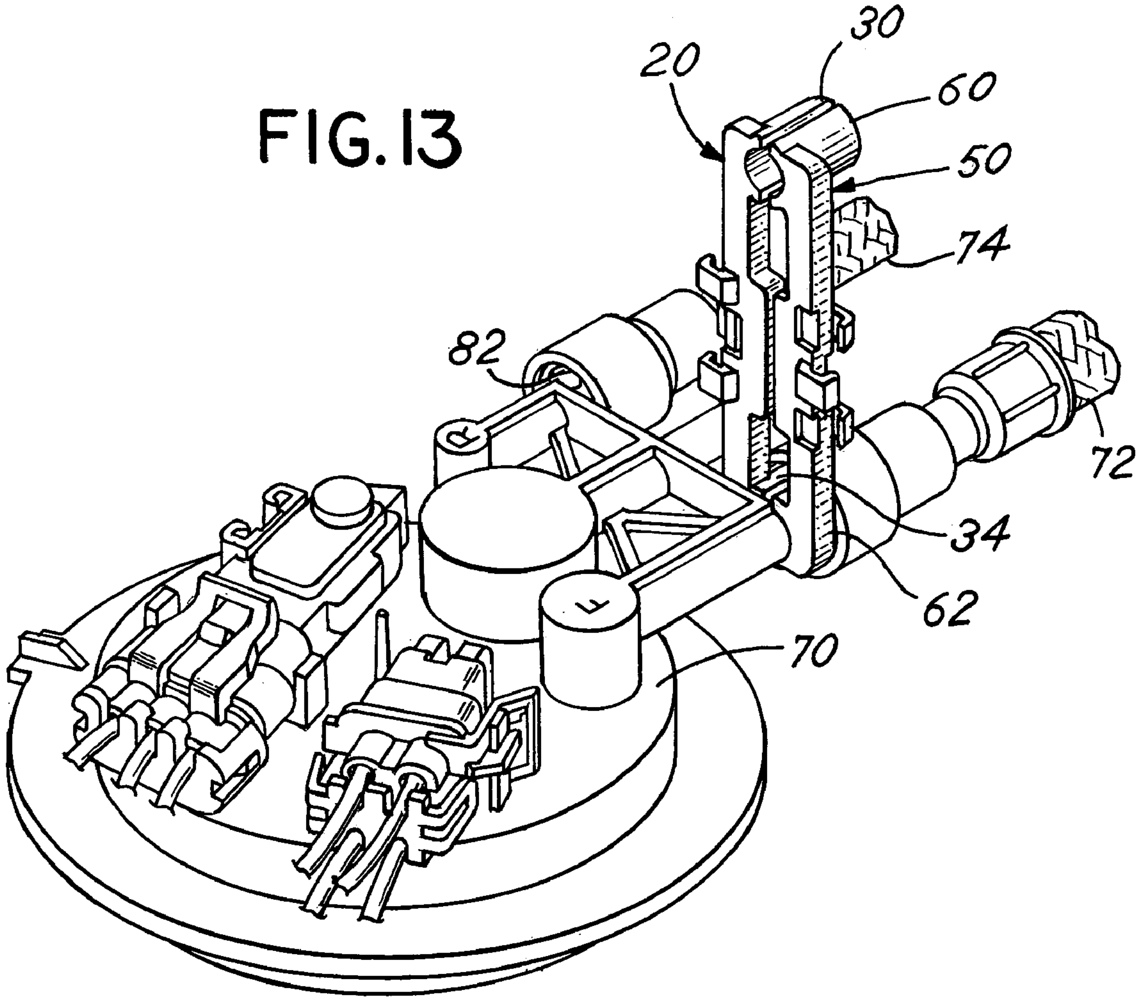
FIG. 13 is an isometric view illustrating the positioning of the second arm member in combination with a first arm member on a fuel line attached to a fuel module fitting.
Figure 14:
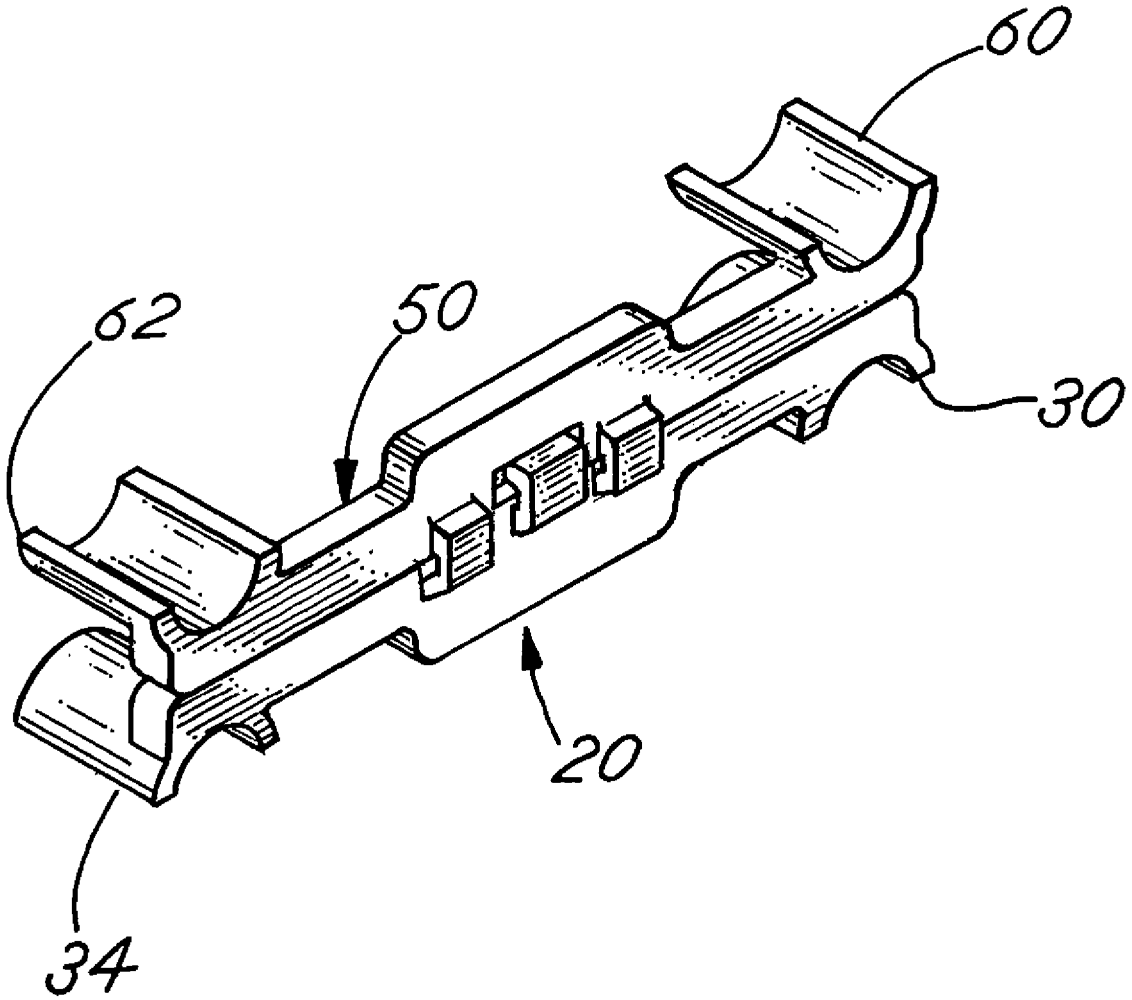
FIG. 14 is an isometric view of the tool of the invention illustrating the first arm member and second arm member joined back to back prior to positioning on a fuel line for removal thereof.

FIG. 14 illustrates in an isometric view the arm members 20 and 50 which comprise the tool. FIGS. 11–13 illustrate the manner of use of the tool. Referring therefore to FIGS. 11–13 there is illustrated a fuel tank module 70 associated with a vehicle. There is also illustrated a fuel line 72; namely, a supply line and a return line 74. Each of the fuel lines 72 and 74 connect with the respective fittings 76 and 78 associated with the module 70. Further, each of the fuel lines 72 and 74 include a ring element 80 and 82 which serves to retain the end of the fuel line 72 and 74 engaged with the appropriate fitting 76 and 78.

In use, a first arm 20 is positioned so that the appropriate end thereof; namely, the larger end in FIG. 11, or in other words, the larger semi-cylindrical section 34 is positioned to engage the locking ring associated with the large fuel supply line 72. The arm 20 is then rotated so as to enable additional access for second arm 50. Thus, the arm 20 is rotated approximately 90° to a second position as illustrated in FIG. 12. Subsequently, the second arm 50 is positioned in opposition to the first arm 20 as illustrated in FIG. 13. When so positioned, the arms 20 and 50 may be manually manipulated so as to be pulled or pushed in the direction of the arrow in FIG. 13 to thereby release the locking ring member associated with the fuel line 72 and thereby disconnect the fuel line 72 from the fuel module 70. A similar operation may be performed to remove the second or smaller fuel line 74. Because the arms 20 and 50 are independent of each other, they may be independently manipulated and positioned so as to effect removal of the fuel line 72 from the fuel module 70. Further, because the opposite ends of each of the arms 20 and 50 include uniquely sized semi-cylindrical sections, the tool may be utilized with various sizes of fuel lines having variously sized fittings associated therewith.

FIG. 14 illustrates the manner in which the first and second arm 20 and 50 may be connected one to the other by means of the interlocking tabs 39, 40 and 41.

A preferred embodiment has been described. Variations may be effected without departing from the spirit and scope of the invention. For example, the size and orientation of the various cylindrical sections may be altered. The extent of the formation of the cylindrical sections may be adjusted. The axial configuration of the semi-cylindrical sections may be altered. The invention is therefore limited only by the following claims and equivalents thereof.

What is claimed is:

1. A tool for disconnecting a fuel line having a longitudinal axis from a fitting, said fuel line of the type including a biased, locking ring for retaining the fuel line engaged with the fitting, said fuel line being disengaged from the fitting by longitudinal axis movement from the fitting, said tool comprising, in combination;

- a first arm member, said first arm member including an elongate body member with a first end and a second end and having a generally elongate axis from the first end to the second end;
- a first semi-cylindrical section at the first end of said first arm member said first semi-cylindrical section having an axis generally transverse to the elongate axis, and said first arm member further including a second semi-cylindrical section at the second end, said second semi-cylindrical section generally transverse to the elongate axis; and a senarate, unconnected second arm member including an elongate body member with a first end and a second end and having a generally elongate axis from the second arm member first end to the second arm member second end;

a first semi-cylindrical section at the first end of the second arm member generally the same size as the first semi-cylindrical section of the first arm member and also having a cylinder axis generally transverse to the second arm member elongate axis, and a second semi-cylindrical section at the second end of the second arm member and also having a cylinder axis generally transverse to the second arm member elongate axis, said first elongate member first cylindrical section and said second elongate member first cylindrical section generally identical in size;

said first elongate member second cylindrical section and said second elongate member second cylindrical section generally identical in size and having a distinct size from the first cylindrical sections, said first cylindrical sections and said second cylindrical sections each projecting axially uniformly from the first and second arm member to form a generally cylindrical locking ring engagement element;

said first and second separate arm members each comprising a substantially straight elongate axis and comprising substantially mirror images of each other with said cylindrical sections projecting from said arms in the same direction.

2. The tool of claim 1 wherein the axes of the cylindrical members are parallel.

3. The tool of claim 1 wherein the elongate arm axes are straight.

4. The tool of claim 1 wherein the fiRst and second arms are substantially mirror images of each other.

5. The tool of claim 1 wherein the axes of the first cylindrical sections are substantially coincident when the arms are positioned together.

6. The tool of claim 1 wherein the axes of the second cylindrical sections are substantially coincident when the arms are positioned together.

* * * * *

UNITED STATES PATENT AND TRADEMARK OFFICE

CERTIFICATE OF CORRECTION

PATENT NO. : 7,127,787 B2
APPLICATION NO. : 10/888194
DATED : October 31, 2006
INVENTOR(S) : Whitehead It is certified that error appears in the above-identified patent and that said Letters Patent is hereby corrected as shown below:

Claim 1, column 5, line 1
Please replace senarate with separate

Claim 4, column 6, lines 12-13
Delete claim 4

Signed and Sealed this

Seventeenth Day of February, 2009

JOHN DOLL
*Acting Director of the United States Patent and Trademark Office*